United States Patent [19]
Muromachi et al.

[11] Patent Number: 5,958,477
[45] Date of Patent: Sep. 28, 1999

[54] WHEY MINERAL CONTAINING AT LEAST 0.8 G/KG ZINC

[75] Inventors: Ayako Muromachi, Tsuchiura; Motokazu Nakayama, Ami-machi; Iwao Sato, Tsuchiura, all of Japan

[73] Assignee: Kyowa Hakko Kogyo Co., Ltd., Tokyo, Japan

[21] Appl. No.: 08/970,355

[22] Filed: Nov. 14, 1997

[30] Foreign Application Priority Data

Nov. 15, 1996 [JP] Japan .................................. 8-305361

[51] Int. Cl.⁶ ........................................................ A23L 1/304
[52] U.S. Cl. ........................ 426/74; 426/478; 426/491; 426/495; 426/583
[58] Field of Search .............................. 426/74, 583, 478, 426/491, 495

[56] References Cited

U.S. PATENT DOCUMENTS 5,185,166  2/1993  Nakagawa et al. .................... 426/74

*Primary Examiner*—Helen Pratt
*Attorney, Agent, or Firm*—Fitzpatrick, Cella, Harper & Scinto

[57] ABSTRACT

The present invention relates to a whey mineral containing at least 0.8 g/kg or above of zinc and to a process for producing the same. The whey mineral of the present invention have good flavors and are useful in liquid formula, medical foods, nourishing reinforced foods, functional foods, seasonings, etc.

10 Claims, 1 Drawing Sheet

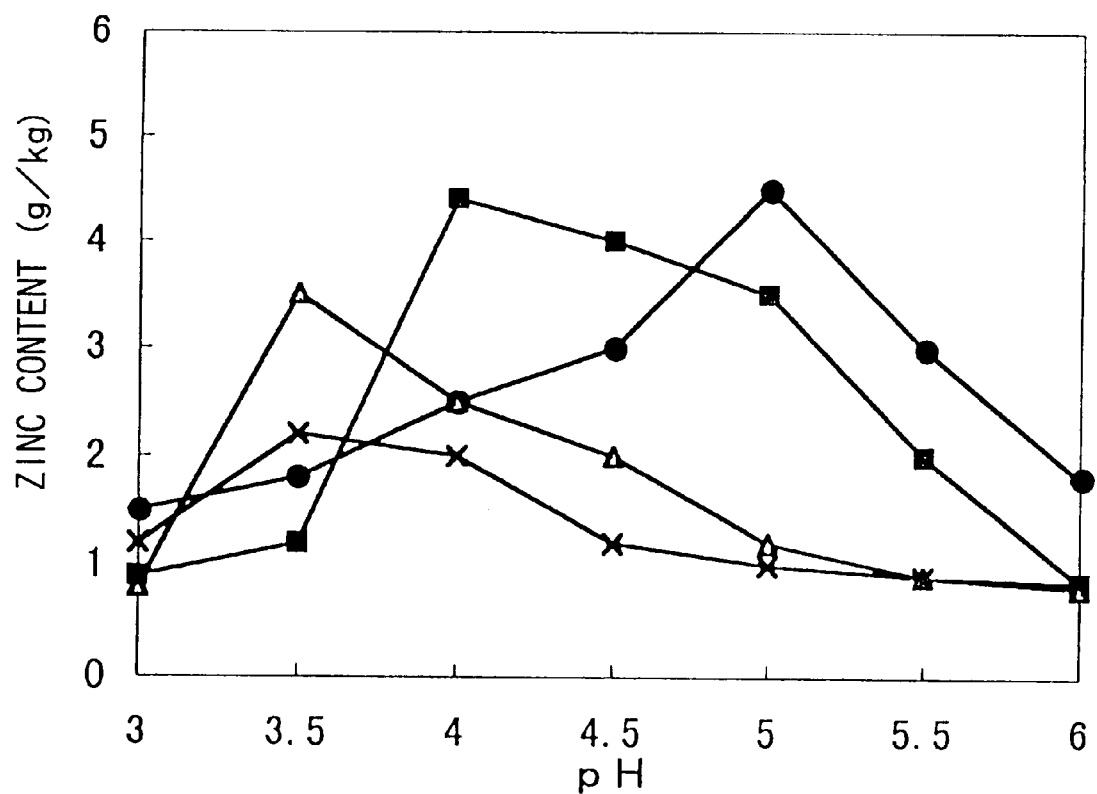

WHEY MINERAL CONTAINING AT LEAST 0.8 G/KG ZINC

FIELD OF THE INVENTION

The present invention relates to a whey mineral of high zinc content useful in liquid formula, foods for medical purposes, nutrient-reinforced foods, functional foods, seasonings, etc.

BACKGROUND OF THE INVENTION

Zinc plays an important role in activity expression and structural maintenance of many enzymes such as carbonate dehydrogenase, carboxypeptidase and alkaline phosphatase, and it is a trace element essential for the function and homeostasis of the living body.

Since zinc is not synthesized in the living body and zinc in the living body is lost in urine, feces or sweat, its intake from daily diet is very important. It is known that a decrease in the intake of zinc causes zinc-deficient conditions such as dysgeusia, poor appetite, delay in remedy of wounds, ateliosis, skin diseases, gangrene of hands and feet, change in nails, loss of hair and reduction in immune ability.

However, zinc salts such as zinc gluconate and zinc sulfate can be used only in substitute foods for mother's milk. To add zinc to liquid formula, foods for medical purposes and other processed foods, there is no means except for use of food and drink containing zinc at high levels. It is known to use oyster meat as a source of supply of zinc derived from food and drink (Japanese Published Examined Application No. 63672/92 and Japanese Published Unexamined Application No. 19385/96), but the use of oyster meat is limited and its processability in food manufacturing is low because of its peculiar smell and the fact that nourishing components in oyster vary depending on four seasons. It is also known to use extracts from seaweed powder, livers of poultry, animals, etc., wheat bran and rice bran (Japanese Published Unexamined Patent Application No. 88964/92), but due to their flavors, there is a limit to foods to which they can be applied.

On the other hand, there is known a process for producing whey calcium which comprises neutralizing a whey mineral solution to pH 6.0 to 8.0 and recovering the resulting insolubles (Handbook of Materials for Food Development, Korin, pp. 553–558, Japanese Published Examined Patent Application No. 60303/90). However, said whey calcium contains only about 0.002 to 0.45 g/kg zinc.

Accordingly, there is demand for a source of supply of zinc being good in flavors, having high processability in food manufacturing and containing zinc at high levels.

The content of calcium in said whey calcium is 400 to 500 times or more than the content of zinc, but the amounts of calcium and zinc required for an adult per day are about 600 mg and about 8 mg respectively, so there is demand for whey minerals whose calcium content is not more than 75-fold relative to the zinc content.

SUMMARY OF THE INVENTION

The object of the invention is to provide a whey mineral of high zinc content with good flavors, which can be added widely to drinks, foods, etc.

The present invention relates to a whey mineral containing 0.8 g/kg or above of zinc (hereinafter referred to as a whey mineral of high zinc content), a process for producing a whey mineral of high zinc content which comprises adjusting a whey mineral solution to pH 3.0 to 6.0 and recovering the resulting insolubles, food and drink containing a whey mineral of high zinc content, and a whey mineral agent of high zinc content containing the whey mineral of high zinc content.

BRIEF DESCRIPTION OF THE DRAWINGS

FIG. 1 shows zinc contents obtained by treating 0.1, 1, 4 and 10% whey calcium solutions at a pH of from 3.0 to 6.0.

DETAILED DESCRIPTION OF THE INVENTION

A whey mineral of high zinc content of the present invention can be produced by adjusting a whey mineral solution to pH 3.0 to 6.0, preferably pH 3.5 to 5.5, more preferably pH 4.0 to 5.0 with hydrochloric acid, sulfuric acid, acetic acid, organic acid such as citric acid or the like, or an alkali such as sodium hydroxide, sodium hydrogen carbonate, calcium carbonate or the like, and then recovering the resulting insolubles by centrifugation, filtration, etc. Moreover, the whey mineral of high zinc content whose zinc content has further been raised is obtained by dissolving the said whey mineral of high zinc content again in water and adjusted to the pH as mentioned above, and recovering the resulting insolubles. The concentration of ash at the step of re-dissolving is preferably 1 to 100 g/kg, more preferably 5 to 50 g/kg.

As the whey mineral of high zinc content of the present invention, the material thus obtained may be used as such, or in the form of solid, powder, etc. after hot-air drying, spray drying, etc.

In the present invention, the whey mineral solution refers to a solution obtained by reducing or removing whey proteins from whey, preferably reducing or removing lactose or to a solution obtained by dissolving whey calcium in water, and the concentration of ash in the solution is preferably in the range of 1 to 100 g/kg, more preferably 5 to 50 g/kg.

The ash in the present invention refers to inorganic matter remaining after incineration of organic matter at 550° C. for 12 hours.

The whey refers to a casein- and butterfat-free solution obtained by removing casein from skimmed milk or to an aqueous solution of whey powder obtained by spray drying said solution.

Although the whey includes acid whey and cheese whey, acid whey is preferably used.

The acid whey is obtained as a supernatant by adding an acid such as sulfuric acid, hydrochloric acid or the like to skimmed milk at 10 to 70° C., preferably about 20 to 50° C., to adjust it to pH 3.0 to 6.0, preferably pH 4.0 to 4.8, more preferably pH 4.6 i.e. the isoelectric point of casein, or by adding a starter of lactic acid bacteria to skimmed milk to a concentration of 0.1 to 0.5%, maintaining it at 22 to 26° C. for 14 to 16 hours, and removing insolubilized casein by centrifugation etc.

The skimmed milk used may be any skimmed milk obtained by centrifugation of milk using a cream separator or any commercial product. A solution prepared by dissolving powdered skimmed milk in water can also be used as the skimmed milk.

The starter of lactic acid bacteria used is any commercial lactic acid bacteria such as *Streptococcus cremoris*.

The milk used in the present invention includes milk from animals such as cow, goat, sheep, camel, reindeer, yak, horse and donkey, among which milk from cow is preferably used.

The whey proteins are milk-derived soluble proteins other than casein, and examples include soluble proteins such as albumin.

The methods of reducing or removing whey proteins from the whey mineral solution include a method by ultra filtration, a method which comprises solidifying the whey mineral solution by heating and removing the resulting solid from the whey mineral, etc. The content of whey proteins in the solution obtained in these methods is 20% or less.

The methods of reducing or removing lactose from the whey mineral solution include a method by ultra filtration, a method of precipitating lactose by concentration and heating, and crystallizing and removing the lactose, etc. The content of lactose in the solution obtained in these methods is 40% or less.

In the present invention, the whey calcium refers to what is obtained by reducing or eliminating whey proteins from acid whey, preferably reducing or eliminating lactose, thereby obtaining a whey mineral solution, adjusting it to pH 6.0 to 8.0, and recovering the resulting insolubles by centrifugation, filtration, etc. Although the whey calcium in the present invention may be that prepared in the above step, commercially available whey calcium can also be used.

As the whey mineral of high zinc content of the present invention, the whey mineral, when determined under the conditions described below, which contains 10 to 500 g/kg, preferably 10 to 300 g/kg proteins and 500 to 990 g/kg, preferably 500 to 900 g/kg of ash, said whey mineral containing 0.8 g/kg or above, preferably 2.4 g/kg or above, more preferably 3.6 g/kg or above of zinc, is mentioned.

The content of zinc in the whey mineral of high zinc content of the present invention can selectively be raised by regulating the concentration of ash, pH, etc. of the whey mineral solution and by repeatedly dissolving the whey mineral in an aqueous medium and subsequent insolubilization, so there is no particular limitation to the upper limit of zinc content, and whey mineral containing 20 g/kg or above zinc can also be obtained.

The whey mineral of the present invention is desirably whey mineral of high zinc content whose calcium content is not more than 75-fold, preferably not more than 60-fold, more preferably not more than 50-fold relative to the zinc content.

The proteins in the whey mineral of high zinc content of the present invention refer to casein or whey proteins.

The zinc content in the obtained whey mineral of high zinc content (hereinafter referred to as whey mineral of high zinc content before drying) is analyzed according to the method described in Hygiene Test Method, Explanatory Note, page 271 (1990).

The whey mineral of high zinc content before drying is dried at 105° C. for 4 hours, and the weight of the dried whey mineral of high zinc content is determined. The zinc content is calculated from the following equation, based on the zinc content in whey mineral of high zinc content, the weight of whey mineral of high zinc content before drying and the weight of whey mineral of high zinc content after drying:

Zinc content (g/kg)=zinc content in whey mineral of high zinc content (g/kg)×(weight of whey mineral before drying/weight of whey mineral after drying)

The calcium content and the amount of calcium are also calculated in the same manner as in the method of measuring the zinc content and the amount of zinc.

The protein content is calculated using the same formula as above except that the zinc amount was replaced by the protein amount.

The protein amount is calculated by determining nitrogen content in the sample according to the Kjeldahl method [Hygiene Test Method, Explanatory Note, compiled by Pharmaceutical Society of Japan, published by Kanahara Publishing Company, page 272 (1990)] and multiplying the nitrogen content by 6.38 which is protein coefficient (nitrogen coefficient).

The content of ash is calculated using the same formula as above except that the zinc amount was replaced by the ash amount.

The ash amount is determined by incinerating the whey mineral at 550° C. for 12 hours in accordance with a method as described in Hygiene Test Method, Explanatory Note, compiled by Pharmaceutical Society of Japan, published by Kanahara Publishing Company, page 271 (1990).

The food and drink of the present invention can be processed and manufactured using a conventional food and drink manufacturing process after the whey mineral of high zinc content of the present invention was added at 0.1 to 4.0%, preferably 0.5 to 3.5%, to food and drink materials. The food and drink of the present invention can further incorporate proteins, sugar, fat, trace elements, vitamins, emulsifiers, perfumes, etc.

The food and drink to which the whey mineral of high content zinc is added may be any food and drink such as soft drinks, teas, beverages containing lactic acid bacteria, frozen sweets, milk, dairy products (butter, cheese, yogurt, processed milk, skimmed milk, etc.), processed meat products (ham, sausage, hamburger, etc.), fish meats, fish meat products (boiled fish paste, grilled fish paste, deep-fried patty of fish paste, sausage, etc.), egg, egg products ("Dashimaki", egg tofu, etc.), confectionery (cookie, jelly, snack confectionery, etc.), bread, noodles, pickled vegetables, smoked meat, dried fish, foods boiled down in soy sauce, foods preserved in salt, soaps, seasonings, etc.

The food and drink of the present invention may be in the form of liquid formula, natural liquid food, semi-digested nourishing food, component nourishing food, drink nourishing food, etc., in addition to the form of usual food and drink (nutrient-reinforced food and drink).

The food and drink of the present invention are taken preferably in an amount of 8 to 16 mg in terms of a zinc intake per day for an adult.

A whey mineral of high zinc content of the present invention may be in any form of tablets, powder, finely divided particles, granules, capsules, syrup, enteric agent, troches, drink, etc.

Although the administration form of the agent of the present invention is not particularly limited, oral administration is preferable. In the case of oral administration, the whey mineral of high zinc content of the present invention may be administered as such, or as a preparation manufactured in ordinary way with fillers acceptable for foods or pharmaceuticals.

The fillers may be any of those generally used, including sugar such as sorbitol, lactose, glucose, etc., dextrin, starch, inorganic matter such as calcium carbonate, calcium sulfate, etc., crystalline cellulose, distilled water, sesame oil, corn oil, olive oil, cottonseed oil, etc.

For pharmaceutical manufacturing, use can be made of additives such as binder, lubricant, dispersant, suspending agent, emulsifying agent, diluent, buffer, anti-oxidant, growth inhibitor of bacteria, etc.

Although the dosage varies depending on the age, sex, degree of disease, administration form, administration interval, agent form, etc, a whey mineral agent of the present invention is divided into 1 to 4 portions and administered in an amount of 8 to 16 mg/day in terms of zinc in the case of oral administration for an adult. If necessary, a dosage outside the above range can also be used.

Hereinafter, the present invention is described in more detail with reference to the Examples which however are not intended to limit the scope of the present invention.

EXAMPLE 1

Whey calcium (ALAMIN 995, produced by New Zealand Dairy Board) was added to 100 ml of deionized water at 0.1%, 1%, 4% and 10% and adjusted to pH 3.0, 3.5, 4.0, 4.5, 5.0, 5.5 and 6.0 with 20% hydrochloric acid with stirring by a magnetic stirrer whereby whey mineral solutions were obtained. The respective whey mineral solutions adjusted to the predetermined pH values were left at 20° C. for 18 hours and the insolubles were recovered by centrifugation, and the resulting insolubles were dried in hot air to obtain whey minerals of high zinc content. The zinc content and calcium content in the whey minerals of high zinc content were determined.

The amount of zinc was analyzed according to the method described in Hygiene Test Method, Explanatory Note, page 271 (1990) by atomic absorption spectrometry after the whey minerals of high zinc content were incinerated at 550° C. for 12 hours.

The whey minerals of high zinc content before drying were dried at 105° C. for 4 hours, and the weight of the dried whey minerals of high zinc content were determined. The zinc content was calculated from the following equation, based on the zinc content in whey mineral of high zinc content, the weight of whey mineral of high zinc content before drying and the weight of whey mineral of high zinc content after drying:

Zinc content (g/kg)=zinc content in whey mineral of high zinc content (g/kg)×(weight of whey mineral before drying/weight of whey mineral after drying)

The calcium content was also calculated in the same manner as in the method of measuring the zinc content.

The results are shown in FIG. 1.

EXAMPLE 2

Whey calcium (ALAMIN 995, produced by New Zealand Dairy Board) was added to 100 ml of deionized water at 2% and adjusted to pH 3.5, 3.8, 4.0, 4.5, 5.0 and 5.5 with 20% hydrochloric acid with stirring by a magnetic stirrer whereby whey mineral solutions were obtained. The respective whey mineral solutions adjusted to the predetermined pH values were left at 20° C. for 18 hours and the insolubles were recovered by centrifugation, and the resulting insolubles were dried in hot air to obtain whey mineral of high zinc content. The zinc content and calcium content and the calcium/zinc ratio in the whey mineral of high zinc content are shown in Table 1.

TABLE 1

| pH | zinc content (g/kg) | calcium content (g/kg) | calcium/zinc ratio |
|---|---|---|---|
| 3.5 | 1.04 | 95 | 91 |
| 3.8 | 2.81 | 116 | 41 |
| 4.0 | 4.27 | 147 | 35 |
| 4.5 | 4.60 | 232 | 50 |
| 5.0 | 2.08 | 232 | 111 |
| 5.5 | 0.89 | 315 | 408 |

EXAMPLE 3

To 300 ml of deionized water, 3 g of whey calcium (ALAMIN 995, produced by New Zealand Dairy Board) was added, adjusted to room temperature, 30, 40, 50 and 60° C., and adjusted to pH 4.2 with 20% hydrochloric acid with stirring by a magnetic stirrer whereby whey mineral solutions were obtained. The respective whey mineral solutions were left overnight at the predetermined temperatures, and the insolubles were recovered by centrifugation, and the resulting insolubles were dried in hot air to obtain whey mineral of high zinc content. The recovery of the whey mineral of high zinc content in comparison with the whey calcium, the zinc and calcium contents, and the calcium/zinc ratio are shown in Table 2.

TABLE 2

| | Temperature | | | | |
|---|---|---|---|---|---|
| | room temperature | 30° C. | 40° C. | 50° C. | 60° C. |
| recovery of whey minerals of high zinc content (%) | 15.3 | 17 | 19 | 35 | 47 |
| zinc content (g/kg) | 3.63 | 2.41 | 2.39 | 1.59 | 1.22 |
| calcium content (g/kg) | 200 | 177 | 178 | 274 | 305 |
| calcium/zinc ratio | 55 | 73 | 74 | 172 | 250 |

EXAMPLE 4

To 1 L of deionized water, 10 g of whey calcium (ALAMIN 995, produced by New Zealand Dairy Board) was added and adjusted to pH 4.35 with 20% hydrochloric acid with stirring by a magnetic stirrer. The whey mineral solution was left at 20° C. for 18 hours, and the insolubles were recovered by centrifugation and dried in hot air to obtain whey mineral of high zinc content hereinafter referred to as whey mineral A.

Whey mineral A of high zinc content was added to deionized water at 1% and adjusted to pH 4.05 to obtain a whey mineral solution. The whey mineral solution was left at 20° C. for 18 hours, and the insolubles were recovered by centrifugation, and the resulting insolubles were dried in hot air to obtain whey mineral of high zinc content hereinafter referred to as whey mineral B.

Whey mineral B of high zinc content was added to deionized water at 1% and adjusted to pH 3.95 to obtain a whey mineral solution. The whey mineral solution was left at 20° C. for 18 hours, and the insolubles were recovered by centrifugation, and the resulting insolubles were dried in hot air to obtain whey mineral of high zinc content hereinafter referred to as whey mineral C.

The recoveries of whey minerals A, B and C in comparison with whey calcium and their zinc and calcium contents and calcium/zinc ratios are shown in Table 3.

TABLE 3

| | whey mineral A | whey mineral B | whey mineral C |
|---|---|---|---|
| recovery of whey mineral (%) | 7 | 2.6 | 0.5 |
| zinc content (g/kg) | 5.70 | 10.20 | 19.90 |
| calcium content (g/kg) | 207 | 180 | 159 |
| calcium/zinc ratio | 36 | 18 | 8 |

EXAMPLE 5

To 9.8 L of deionized water, 100 g of whey calcium (ALAMIN 995, produced by New Zealand Dairy Board)

was added and adjusted to pH 4.2 with 20% hydrochloric acid with stirring. The whey mineral solution was left at 20° C. for 18 hours, and the insolubles were recovered by centrifugation, and the resulting insolubles were dried in hot air to obtain 15.2 g of whey mineral of high zinc content.

The whey mineral of high zinc content and the whey calcium were analyzed for their components.

The ash amount was determined by incinerating the whey mineral at 550° C. for 12 hours in accordance with the method as described in Hygiene Test Method, Explanatory Note, compiled by Pharmaceutical Society of Japan, published by Kanahara Publishing Company, page 271 (1990).

The content of ash was calculated using the same formula as above except that the zinc amount was replaced by the ash amount.

The protein amount was calculated by determining nitrogen content in the sample according to the Kjeldahl method [Hygiene Test Method, Explanatory Note, compiled by Pharmaceutical Society of Japan, published by Kanahara Publishing Company, page 272 (1990)] and multiplying the nitrogen content by 6.38 which is protein coefficient (nitrogen coefficient).

The protein content was calculated using the same formula as above except that the zinc amount was replaced by the protein amount.

To determine the lipid amount, the sample was decomposed with a solution of hydrochloric acid, and lipids were extracted from the decomposed sample with ether and petroleum ether. All the extracts were mixed followed by removal of the solvent and drying at about 100° C., and the weight of the dried residue was assumed to be the lipid amount [Hygiene Test Method, Explanatory Note, compiled by Pharmaceutical Society of Japan, published by Kanahara Publishing Company, page 323 (1990)].

The lipid content was calculated using the same formula as above except that the zinc amount was replaced by the lipid amount.

The results are shown in Table 4.

TABLE 4

|  | whey mineral of high zinc content | whey calcium |
|---|---|---|
| content of ash (g/kg) | 696 | 604 |
| zinc content (g/kg) | 4.60 | 0.48 |
| calcium content (g/kg) | 233 | 285 |
| protein content (g/kg) | 171 | 80 |
| lipid content (g/kg) | trace | trace |

EXAMPLE 6

The whey mineral of high zinc content prepared in Example 5, an oyster meat extract (zinc content: 2 g/kg) and seaweed powder (zinc content: 31 g/kg) were added respectively to a liquid formula containing 2.5 mg of zinc every 1500 ml (1500 kcal), whereby a liquid formula containing 8 mg of zinc every 1500 ml was prepared. The liquid formula to which zinc was not added was used as the non-addition group.

The method of preparing the addition group is as follows:

In 8.4 kg of hot water at 40° C., 0.4 kg of sodium casein, 1.5 kg of dextrin, 0.01 kg of monoglyceride, 0.09 kg of a zinc-free mineral mixture (15 g of sodium, 10 g of potassium, 2 g of magnesium, 4 g of phosphorus, 90 mg of iron, and 600 mg of calcium/1500 ml liquid formula in each test group), and 0.01 kg of a vitamin mixture (15000 IU of vitamin A, 10 mg of vitamin B1, 10 mg of vitamin B2, 20 mg of vitamin B6, 20 $\mu$g of vitamin B12, 400 mg of vitamin C, 1000 IU of vitamin D3, 150 mg of vitamin E, 100 mg of niacin, 100 mg of pathetic acid, 50 $\mu$g of folic acid) were dissolved. Further, 8.3 g of the whey minerals of high zinc content prepared in Example 5, 18 g of oyster meat extract, and 1.2 g of seaweed powder were dissolved respectively in it. To each solution, 0.14 kg of rape oil and 0.09 kg of corn oil were added, and then each solution was preliminarily emulsified with a homomixer and homogenated with a high-pressure homogenizer (400 kg/cm$^2$) to prepare 10 L of 1 kcal/ml liquid formula.

The liquid formula in the respective test groups were sterilized at 121° C. for 10 minutes and examined in an organoleptic test by 5 expert panels.

Their organoleptic evaluation was made and given 5-step evaluation points 1 to 5 where a larger number indicates better results.

The results are shown in Table 5.

TABLE 5

| Test Group | Evaluation Score | Comment |
|---|---|---|
| non-addition | 4.4 | good flavors |
| whey minerals of high zinc content | 4.2 | good flavors |
| oyster meat extract | 1.3 | strong oyster smell |
| seaweed powder | 3.1 | fishy smell is felt |

The group where the whey mineral of high zinc content was added indicated good flavors similar to the non-addition group.

EXAMPLE 7

The whey mineral of high zinc content prepared in Example 5, an oyster meat extract (zinc content: 2 g/kg), and seaweed powder (zinc content: 31 g/kg) were added to an acidic calcium drink respectively in an amount of 3 mg every 100 ml of the acidic calcium drink. The acidic calcium drink to which zinc was not added was used as the non-addition group.

The method of preparing the addition group is as follows:

In water, 12 g of sucrose, 0.6 g of citric acid, 0.5 g of ascorbic acid, 1.2 g of calcium lactate and perfumes were dissolved to give 100 ml solution. In the solution, 0.7 g of the whey mineral of high zinc content prepared in Example 5, 1.5 g of oyster meat extract and 0.1 g of seaweed powder were dissolved respectively to prepare an acidic calcium drink. The content of calcium in the group where the whey mineral of high zinc content were added was adjusted to the same level as in other test groups by controlling the amount of calcium lactate added.

The acidic calcium drinks in each test group were sterilized by heating it at 90° C. for 10 minutes and examined by 5 expert panels to evaluate its organoleptic properties.

The results are shown in Table 6.

TABLE 6

| Test Group | Evaluation Score | Comment |
| --- | --- | --- |
| non-addition | 4.5 | good flavors |
| whey minerals of high zinc content | 4.4 | good flavors |
| oyster meat extract | 1.1 | strong oyster smell |
| seaweed powder | 2.9 | fishy smell |

The group where the whey mineral of high zinc content were added indicated good flavors similar to the non-addition group.

EXAMPLE 8

The whey mineral of high zinc content prepared in Example 5, an oyster meat extract (zinc content: 2 g/kg) and seaweed powder (zinc content: 31 g/kg) were mixed to prepare cookies containing 5 mg of zinc in 5 cookies. The cookies to which zinc was not added were used as the non-addition group.

The method of preparing the addition group is as follows:

To give a mixture, 90 g of salt-free butter was kneaded into a cream form and 55 g of granulated sugar and 5 ml of milk were added to it. 130 g of soft flour, 0.6 g of baking powder and 3.4 g of whey mineral of high zinc content (7.5 g of oyster meat extract, 0.48 of g seaweed powder) were combined, screened, added to, and slightly mixed with, the mixture, left at 5° C. for 30 minutes, extended into a 20 cm×25 cm sheet with a rod, and cut into 15 dough sheets of 7 cm×5 cm in size. The dough sheets were baked in an oven at 170° C. for 15 minutes to prepare cookies.

5 expert panels evaluated the cookies in each test group for organoleptic properties.

The results are shown in Table 7.

TABLE 7

| Test Group | Evaluation Score | Comment |
| --- | --- | --- |
| non-addition | 4.3 | good flavors |
| whey minerals of high zinc content | 4.1 | good flavors |
| oyster meat extract | 1.1 | fishy smell |
| seaweed powder | 3.8 | slightly fishy smell |

The group where the whey minerals of high zinc content were added indicated good flavors similar to the non-addition group.

EXAMPLE 9

To 50 g of the whey mineral of high zinc content prepared in Example 5, 47 g of lactose and 3 g of lubricant are added and mixed and made into tablets.

What is claimed is:

1. A whey mineral containing 0.8 g/kg or above of zinc.
2. The whey mineral according to claim 1, wherein the whey mineral contains 10 to 500 g/kg of protein and 500 to 990 g/kg of ash.
3. The whey mineral according to claim 2, wherein the whey mineral contains at least 2.4 g/kg of zinc.
4. The whey mineral according to claim 3, wherein the whey mineral contains at least 3.6 g/kg of zinc.
5. The whey mineral according to any of claims 1, 2, 3 or 4 having a calcium content which is not more than 75-fold relative to the zinc content.
6. Food or drink containing the whey mineral of claim 5.
7. A whey mineral agent of high zinc content containing the whey mineral of claim 5.
8. A process for producing a whey mineral comprising 0.8 g/kg or above of zinc, which comprises adjusting a whey mineral solution to pH 3.0 to 6.0 and recovering the resulting insolubles.
9. The process according to claim 8, wherein the whey mineral solution is derived from an acid whey.
10. The process according to claim 8 or 9, having a calcium content in the whey mineral which is not more than 75-fold relative to the zinc content.

* * * * *